(12) United States Patent
Shimomura et al.

(10) Patent No.: US 6,679,657 B2
(45) Date of Patent: Jan. 20, 2004

(54) TOOL FOR BORE DIAMETER WORK

(75) Inventors: Hiroshi Shimomura, Tsukuba (JP);
Tomoyoshi Sakamoto, Abiko (JP)

(73) Assignee: Mitsubishi Materials Corporation, Tokyo (JP)

( * ) Notice: Subject to any disclaimer, the term of this patent is extended or adjusted under 35 U.S.C. 154(b) by 0 days.

(21) Appl. No.: 10/096,585

(22) Filed: Mar. 14, 2002

(65) Prior Publication Data

US 2002/0131831 A1 Sep. 19, 2002

(30) Foreign Application Priority Data

Mar. 19, 2001 (JP) .................................. P2001-079540

(51) Int. Cl.[7] .............................................. B23B 27/04
(52) U.S. Cl. ........................................ 407/109; 407/107
(58) Field of Search ................... 407/109, 117, 407/107, 112

(56) References Cited

U.S. PATENT DOCUMENTS

| | | | | |
|---|---|---|---|---|
| 3,811,162 A | * | 5/1974 | Bay | 82/36 |
| 4,195,956 A | | 4/1980 | Mihic | |
| 6,234,727 B1 | * | 5/2001 | Barazani | 407/117 |
| 6,244,790 B1 | * | 6/2001 | Kingdom et al. | 407/108 |
| 6,249,950 B1 | * | 6/2001 | Brask et al. | 29/434 |

FOREIGN PATENT DOCUMENTS

| | | |
|---|---|---|
| DE | 2305111 | 8/1974 |
| DE | 4236370 A | 5/1994 |
| EP | 0264013 A | 4/1988 |
| FR | 2580531 A | 10/1986 |
| JP | 11-277309 | 10/1999 |
| JP | 2000-071113 | 3/2000 |
| JP | 2000-246515 | 9/2000 |

OTHER PUBLICATIONS

European Search Report dated Jun. 26, 2003.

* cited by examiner

*Primary Examiner*—Willmon Fridie, Jr.
(74) *Attorney, Agent, or Firm*—Rader, Fishman & Grauer PLLC

(57) ABSTRACT

In the tool for bore diameter work of the present invention, first and second insert restraining faces are provided opposite each other on a insert installation section, and have projecting V-shapes parallel to the longitudinal direction of a shank. The top and bottom faces of the insert have indented V-shapes in correspondence with the first and second insert restraining faces. When a clamp bolt is tightened, the first insert restraining face elastically changes shape toward the second insert restraining face, pressingly securing the insert in the shank. Therefore, the insert can be easily attached and removed, and high installation rigidity of the insert can be maintained.

11 Claims, 12 Drawing Sheets

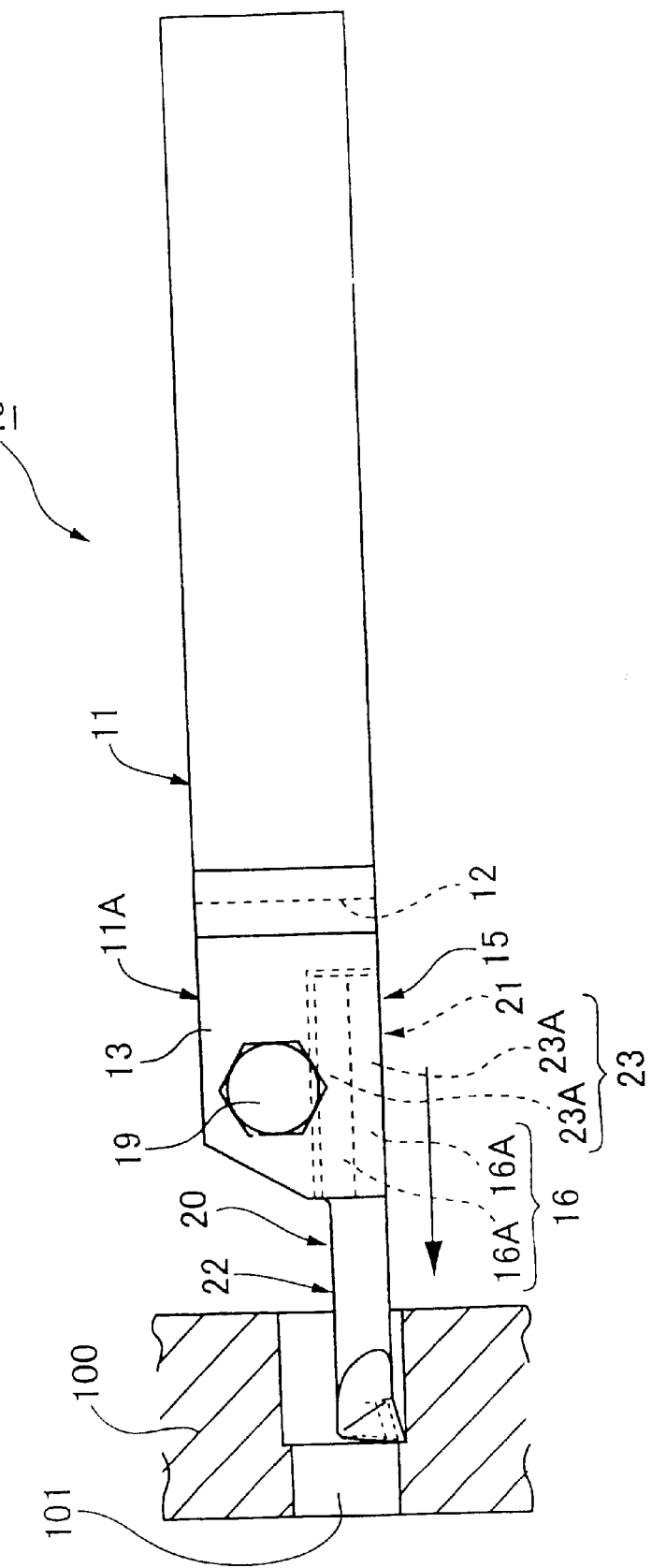

TOOL FOR BORE DIAMETER WORK

BACKGROUND OF THE INVENTION

1. Field of the Invention

The present invention relates to a tool for bore diameter work, used in bore diameter work such as, for example, boring, inserting grooves, and screw-cutting.

2. Description of the Related Art

Japanese Patent Application, First Publication, No. 11-277309 discloses one example of a conventional tool for bore diameter work of this type.

In this type of tool for bore diameter work, the flat base of a throw-away insert (hereinafter abbreviated as "insert"), comprising a small-diameter rod-like section having a cutting-blade, is secured in a insert pocket at the tip portion of a long holder by a securing bolt which passes through the flat base; in addition, the side faces of the flat base are positioned by two wall faces, which stand out from the insert seat face of the insert pocket.

However, in the tool for bore diameter work described above, it is troublesome to insert and remove the insert, since the securing bolt which passes through the flat base of the insert must be extracted in order to do this.

Furthermore, since the side faces of the flat base are positioned by the two wall faces, which stand out from the insert seat face of the insert pocket, a slight difference between the shape of the insert pocket and the shape of the flat base reduces the installation rigidity of the insert, and any force sustained when carrying out cutting work (in particular, a force which is parallel to the flat base and perpendicular to the longitudinal direction of the holder) is liable to jolt the insert and reduce the positioning precision of the cutting-blade of the insert.

There are ways of increasing the installation rigidity of the insert, such as using a set bolt to press the side faces of the flat base as disclosed in Japanese Patent Application, First Publication, No. 2000-71113. However, this tool for bore diameter work has the same drawback that the insert cannot be inserted or removed without completely extracting the set bolt. Moreover, the use of the set bolt increases the number of components and makes the tool more troublesome to use.

Attempts have been made to facilitate the insertion and removal of the insert, such as in the tool for bore diameter work disclosed in Japanese Patent Application, First Publication, No. 2000-246515. However, since securing the insert in the holder by using the head of a clamp bolt to press a slope which is provided on the top face of the insert, there is point- or line-contact between the insert and the clamp bolt, and consequently, the problem of insert installation rigidity remains.

SUMMARY OF THE INVENTION

The present invention has been realized in view of the circumstances described above, and aims to provide a cutting tool in which the insert has high installation rigidity and can be easily removed and inserted.

In order to achieve the above objects, the tool for bore diameter work according to the present invention comprises a pair of insert restraining faces, provided opposite each other at a tip portion of a shank, which is pressed by a clamping unit so that the pair of insert restraining faces move closer to each other, thereby pressingly securing top and bottom faces of a throw-away insert, which directly contacts the paid of insert restraining faces. The throw-away insert comprises a substantially rod-like protrusion having a cutting-blade, which projects to the tip side of the shank. The pair of insert restraining faces have an indented or projecting V-shape parallel to the longitudinal direction of the shank, and the top and bottom faces of the throw-away insert have a projecting or indented V-shape which can connect with the pair of insert restraining faces.

According to this constitution, the insert is pressingly secured when the indented or projecting V-shaped insert restraining faces mesh with the top and bottom faces of the insert, which are shaped in correspondence therewith. Therefore, superior insert installation rigidity and insert positioning precision can be maintained.

Furthermore, since the insert restraining faces have indented or projecting V-shapes parallel to the longitudinal direction of the shank, the rigidity is especially strong against a force from the direction intersecting the longitudinal direction of the shank at the time of cutting.

Moreover, the pressing force exerted by the insert restraining faces against the top and bottom faces of the insert can be reduced by using a clamping unit to slightly loosen the clamp, thereby allowing the insert to be attached and removed easily and increasing workability.

BRIEF DESCRIPTION OF THE DRAWINGS

FIG. 7 is a diagram showing how the tool for bore diameter work of FIG. 1 is used in boring work.

DESCRIPTION OF THE PREFERRED EMBODIMENT

An embodiment of the present invention will be explained with reference to the accompanying drawings.

Figure 1:
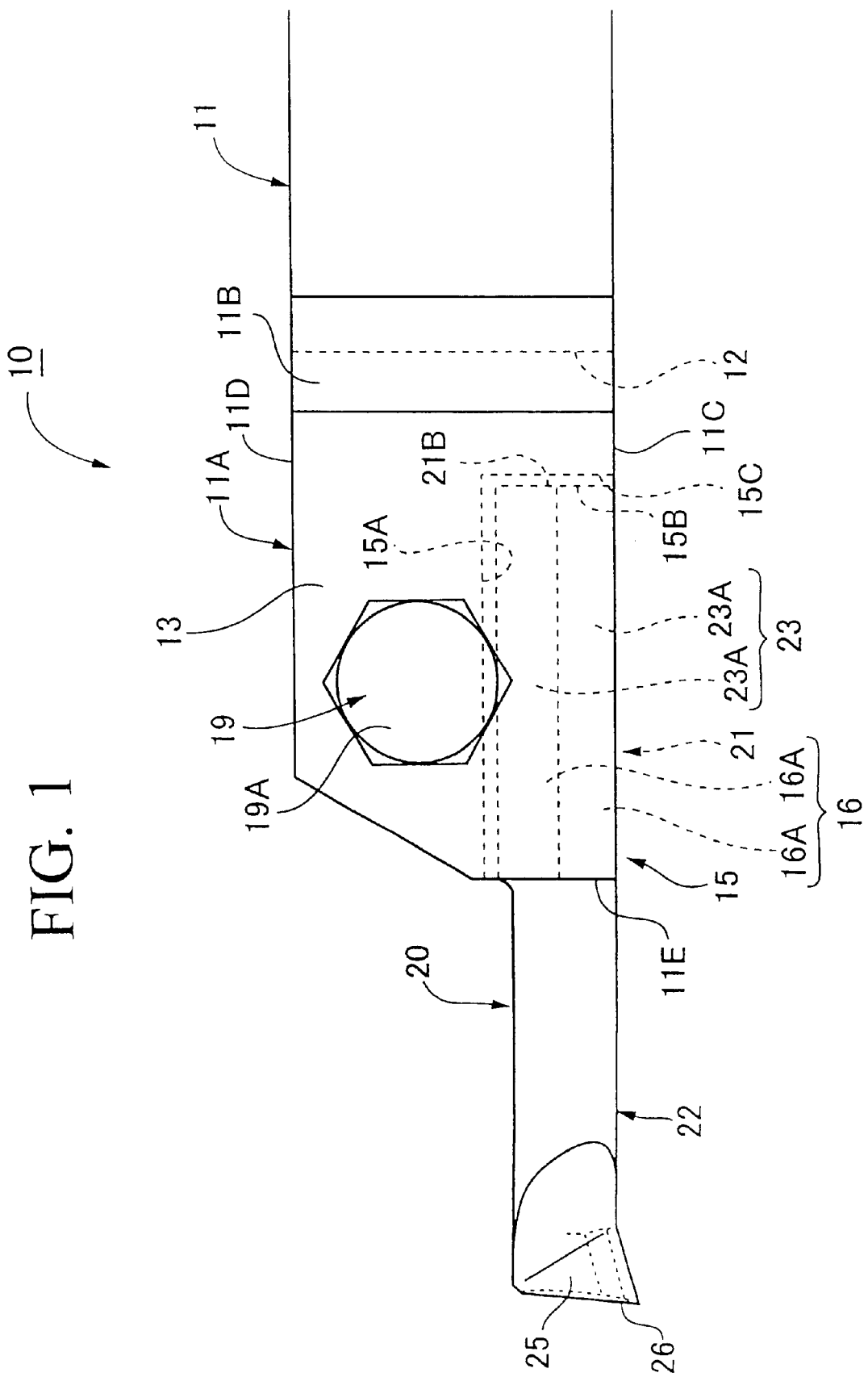
FIG. 1 is a top view of a tool for bore diameter work according to an embodiment of the present invention.
Figure 2:
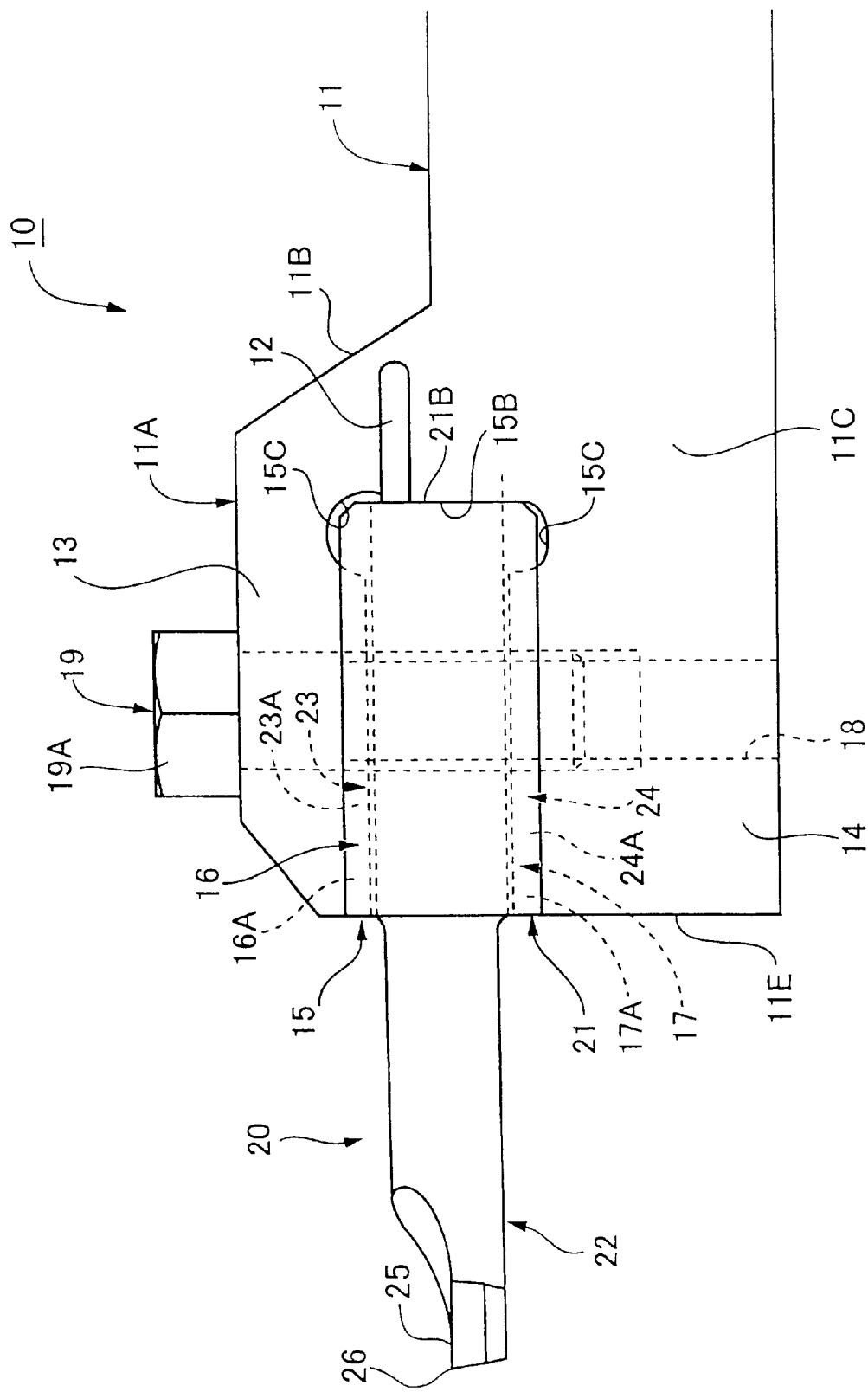
FIG. 2 is a side view of the tool for bore diameter work of FIG. 1.
Figure 3:
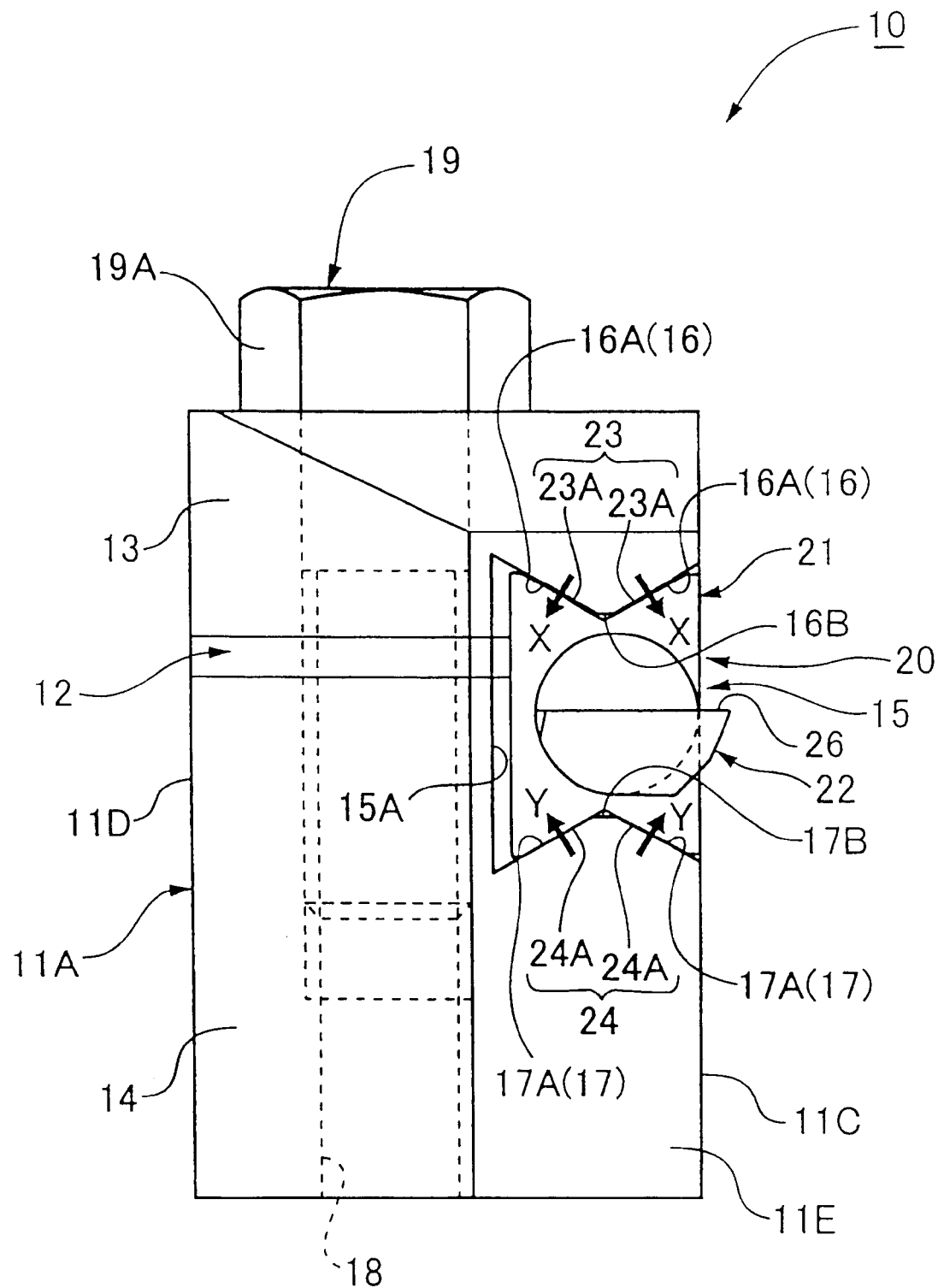
FIG. 3 is a front view of the tool for bore diameter work of FIG. 1.
Figure 4:
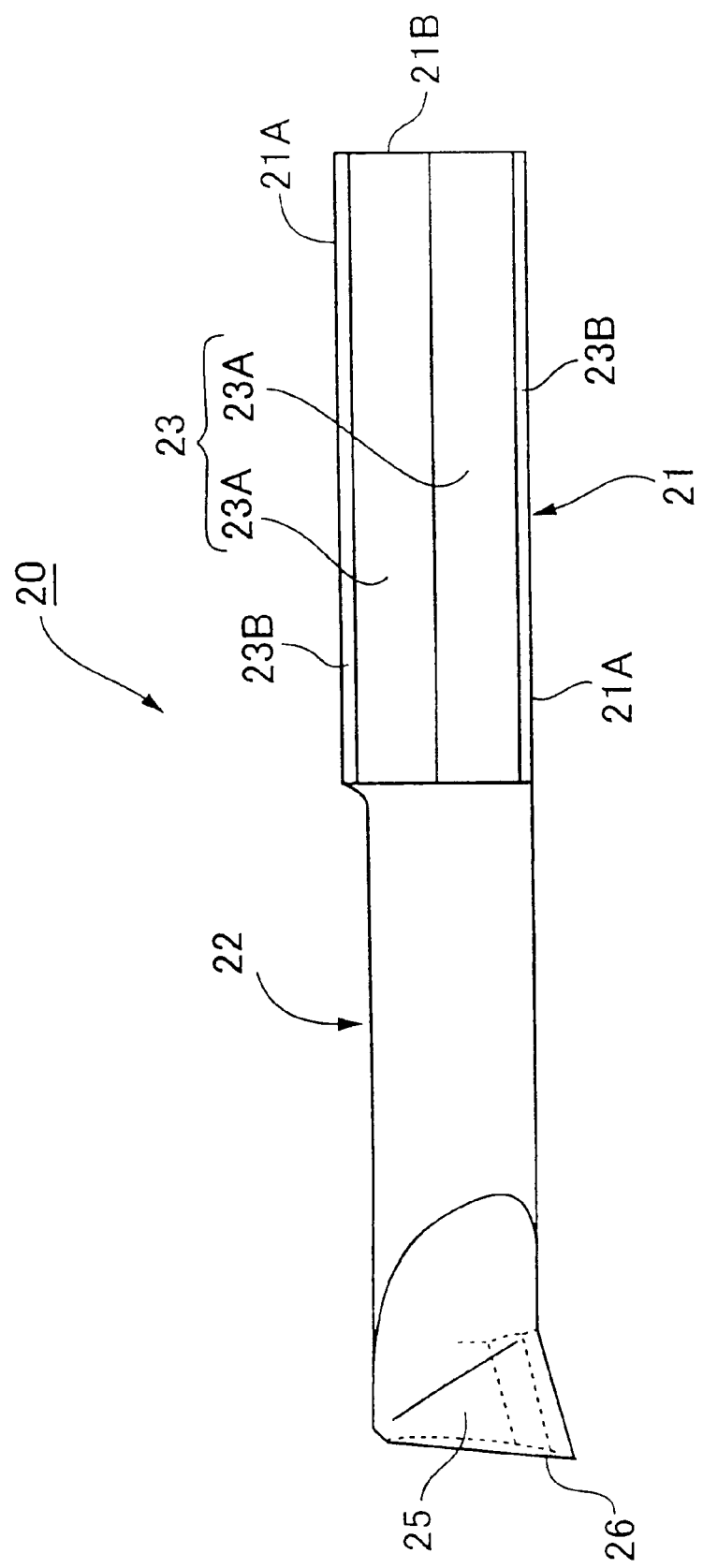
FIG. 4 is a top view of a insert which is installed in the tool for bore diameter work of FIG. 1.
Figure 5:
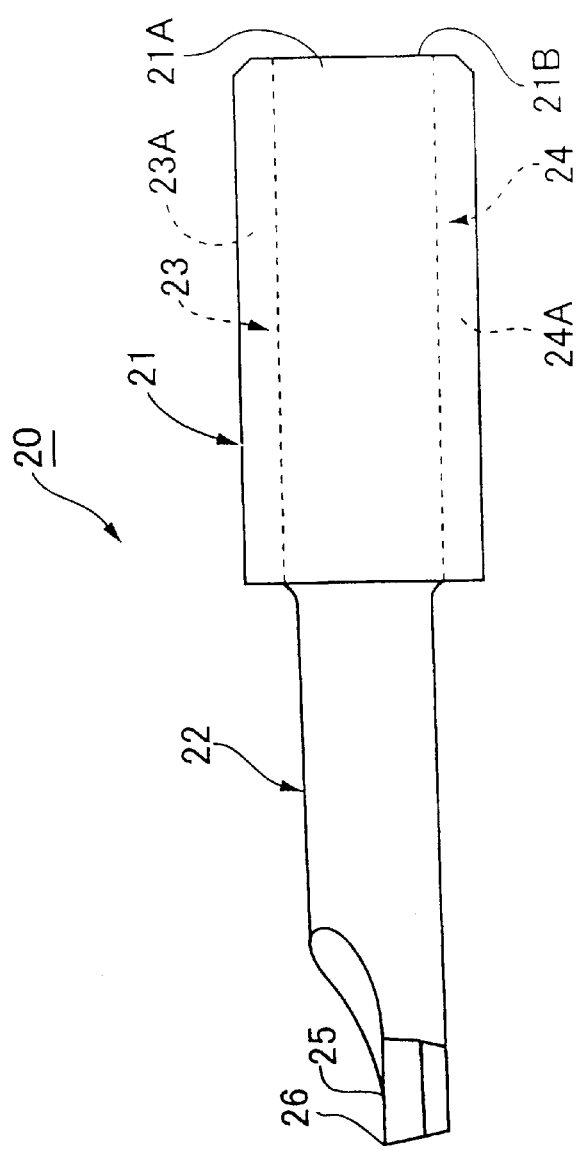
FIG. 5 is a side view of the insert which is installed in the tool for bore diameter work of FIG. 1.
Figure 6:
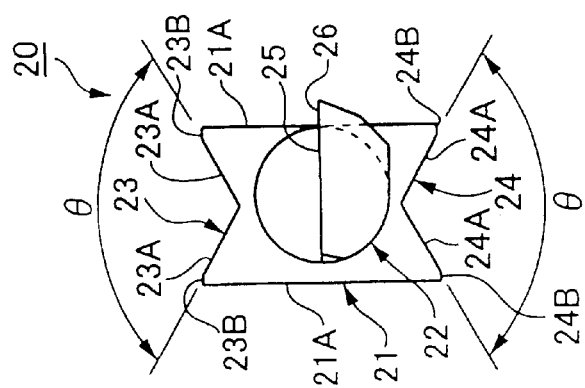
FIG. 6 is a front view of the insert which is installed in the tool for bore diameter work of FIG. 1.

FIG. 1 is a top view of a tool for bore diameter work according to this embodiment, FIG. 2 is a side view of the tool for bore diameter work, FIG. 3 is a front view of the tool for bore diameter work, FIG. 4 is a top view of a insert which is installed in the tool for bore diameter work, FIG. 5 is a side view of the same insert, and FIG. 6 is a front view of the same insert.

As shown in FIGS. 1 to 3, the tool for bore diameter work 10 according to this embodiment has a substantially square-column shank 11, the tip portion 11A of the shank 11 extending from the base side section of the shank 11 via a sloping side face 11B to the upper side of the thick side (the up-down direction in FIGS. 2 and 3) so as to increase the thickness thereof.

A slit 12 which parallels to the top and bottom faces of the shank 11, runs from the tip face 11E of the shank 11 toward the base side to a position nearly touching the sloping side face 11B, thereby dividing the tip portion 11A of the shank 11 into two sections.

At the divided tip portion 11A of the shank 11, the tip portion 11A on the upper side of the slit 12 becomes a first insert restraining section 13, and the tip portion 11A on the lower side of the slit 12 becomes a second insert restraining section 14. In the first insert restraining section 13, the slit 12 runs to the position which nearly touches the sloping side face 11B of the shank 11, and the root section of its base side becomes thin section. As a result, with this thin section as a fulcrum, the first insert restraining section 13 can be elastically change the shape thereof toward the second insert restraining section 14 side.

A insert installation section 15 for attaching a insert 20 (explained later) is provided at the tip portion 11A of the shank 11 by providing openings in the tip face 11E and one side face 11C of the shank 11, and cutting away the tip portion 11A of the shank 11 along the longitudinal direction of the shank 11 so as to connect to the slit 12. The length of the insert installation section 15 along the longitudinal direction of the shank 11 is shorter than that of the slit 12.

The insert installation section 15 comprises a wall face 15A which faces the same direction as one side face 11C of the shank 11, a side face 15B which faces the tip face 11E of the shank 11 in which a base face 21B of the insert main body 21 being positioned by directly contacting the side face 15B at the time of attaching the insert 20, and first and second insert restraining faces 16 and 17 which face each other at the top and bottom (parallel to the thick side of the shank 11). Furthermore, since a slit 12 is provided in the wall face 15A, which faces the side same as the side face 11C of the shank 11, the first insert restraining face 16 is provided in the first insert restraining section 13 on the upper side of the slit 12, and the second insert restraining face 17 is provided in the second insert restraining section 14 on the lower side of the slit 12.

The first insert restraining face 16, provided in the first insert restraining section 13, comprises two flat side walls 16A; the intersection ridgeline of the side walls 16A extends parallel to the longitudinal direction of the shank 11, and the first insert restraining face 16 forms a projecting V-shape parallel to the longitudinal direction of the shank 11.

That is, when viewed in cross-section at a right angle to the longitudinal direction of the shank 11, the cross-sectional shape of the first insert restraining face 16 is a projecting V-shape, gradually protruding to the lower side as it approaches the approximate center, parallel to the width of the first insert restraining face 16.

Furthermore, chamfering 16B is provided at the intersection ridgeline of the wall faces 16A in the first insert restraining face 16.

The second insert restraining face 17, provided in the second insert restraining section 14, comprises two flat side walls 17A and forms a projecting V-shaped parallel to the longitudinal direction of the shank 11; in addition, chamfering 16B is provided at the intersection ridgeline of the wall faces 17A. Thus, the second insert restraining face 17 has the same shape as the first insert restraining face 16.

Recesses 15C are provided at the upper and lower sides of the bottom face 15B of the insert installation section 15.

At the tip portion 11A of the shank 11, a clamp hole 18 is provided near the other side face 11D of the shank 11, but not connecting to the first and second insert restraining faces 16 and 17, and passes through the tip portion 11A of the shank 11 parallel to the thick side thereof. A clamp bolt 19 is tightly screwed into the clamp hole 18, and the head 19A of the clamp bolt 19 presses against the first insert restraining section 13, which elastically changes its shape toward the second insert restraining section 14. In other words, the first insert restraining face 16 provided on the first insert restraining section 13, and the second insert restraining face 17 provided on the second insert restraining section 14, elastically change their shape toward each other and press against the top face 23 and bottom face 24 of the insert 20, which is attached in direct contact with the first and second insert restraining faces 16 and 17.

As shown in FIGS. 4 to 6, the insert 20 is attached to the insert installation section 15 and comprises a insert main body 21 having the shape of a substantially square column, and a protrusion 22, which protrudes from the tip side of the insert main body 21 parallel to the longitudinal direction of the insert main body 21.

The insert main body 21 has a top face 23 which comprises two flat wall faces 23A, the intersection ridgeline of the wall faces 23A and 23A extending parallel to the longitudinal direction of the insert 20 and forming an indented V-shape, which is parallel to the longitudinal direction of the insert 20.

That is, when viewed in cross-section at a right angle to the longitudinal direction of the insert 20, the top face 23 has an indented V-shape, gradually protruding to the lower side as it approaches the approximate center, in a direction parallel to the width of the top face 23. Therefore, the shape of the top face 23 corresponds to that of the first insert restraining face 16.

Furthermore, chamfered sections 23B are provided at the sections of the face 23 where the wall faces 23A meet the side faces 21A of the insert main body 21.

The bottom face 24 of the insert main body 21 similarly comprises two wall faces 24A, and has an indented V-shape parallel to the longitudinal direction of the insert 20; in addition, chamfering sections 24B are provided at the section on the bottom face 24 where the wall faces 24A meet the side faces 21A of the insert main body 21. Thus the bottom face 24 has the same shape as the second insert restraining face 17.

Preferably, the narrow angle □ between the two flat wall faces 23A forming the top face 23, and the narrow angle □ between the two flat wall faces 24A forming the top face 24, should be between 90 to 150 degrees.

Furthermore, a relief face 25 faces the top face 23 of the insert main body 21, and is provided at the tip of the substantially round-headed rod-like protrusion 22, which protrudes at the tip side and is parallel to the longitudinal direction of the insert main body 21. In addition, a cutting-blade 26 is provided at the tip side ridgeline of the relief face 25, and protrudes outwardly from the side face 21A of the insert main body 21.

The insert 20 is attached to the shank 11 in the following way.

Firstly, the insert 20 is inserted into the insert installation section 15 until its base face 21B directly contacts the lower face 15B of the insert installation section 15. In this state, the top face 23 of the insert main body 21 directly contacts the first insert restraining face 16 and the bottom face 24 of the insert main body 21 directly contacts the second insert restraining face 17.

Then, by tightening the clamp bolt 19, the head 19A of the clamp bolt 19 presses against the first insert restraining section 13, and the first insert restraining face 16 elastically changes shape toward the second insert restraining face 17.

Consequently, the top face 23 and bottom face 24 of the insert 20 are pressed against the first insert restraining face 16 and second insert restraining face 17 respectively, securely pressing the insert 20 into the shank 11.

As shown in FIG. 3, in this state, the wall faces 16A, which form the first insert restraining face 16, each exert a pressing force X at right angles to the wall faces 16A against the wall faces 23A, which form the top face 23 of the insert main body 21. Moreover, the wall faces 17A, which form the second insert restraining face 17, each exert a pressing force Y at right angles to the wall faces 17A against the wall faces 24A, which form the bottom face 24 of the insert main body 21.

When the insert 20 has been attached in this manner to the tool for bore diameter work 10, the cutting-blade 26 at the tip of the protrusion 22 of the insert, which protrudes from the tip side of the shank 11, outwardly protrudes from one side face 11C of the shank 11. As for example shown in FIG. 7, the protrusion 22 is inserted into an inner peripheral face 101 of a work 100, and boring is carried out by using the cutting-blade 26.

According to the tool for bore diameter work 10 having the constitution described above, the first and second insert restraining faces 16 and 17 press against the top and bottom faces 23 and 24 of the insert main body 21, attached to the shank 11, and each has a projecting V-shape parallel to the longitudinal direction of the shank. Therefore, the first insert restraining face 16 meshes with the top face 23 of the insert main body 21, and the second insert restraining face 17 meshes with the bottom face 24 of the insert main body 21, whereby these faces touch each other and are pressingly secured. Consequently, it becomes possible to maintain high installation rigidity of the insert 20, and to achieve superior positioning precision of the tip of the blade.

Furthermore, since the first and second insert restraining faces 16 and 17 form a V-shape parallel to the longitudinal direction of the shank 11, strong rigidity can be exerted against a force which intersects the longitudinal direction of the shank 11 at the time of cutting.

By using the clamp bolt 19 to slightly loosen the clamp of the first insert restraining section 13, the pressing force exerted by the first and second insert restraining faces 16 and 17 against the top and bottom faces 23 and 24 of the insert main body 21 is reduced, allowing the insert 20 to be attached and removed easily without removing the clamp bolt 19 and thereby increasing workability.

In the tool for bore diameter work 10 described above, the top and bottom faces 23 and 24 of the insert main body 21 are contacting the first and second insert restraining faces 16 and 17, but the constitution is not limited to this; the insert 20 can be securely pressed without contact between these faces, obtaining the same effects as described above.

Figure 8A:
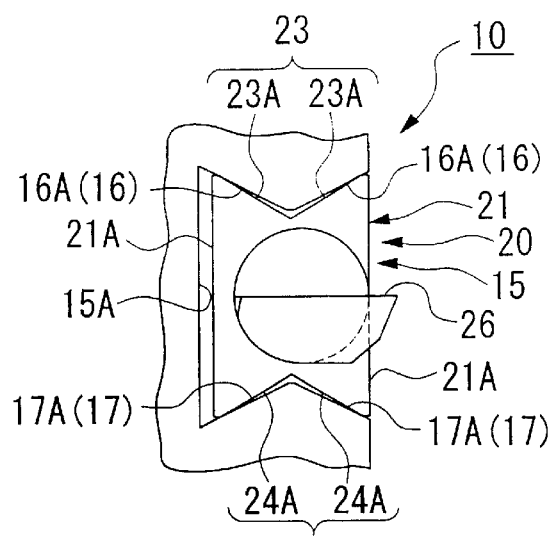
FIG. 8A is a front view of the tool for bore diameter work according to another embodiment of the present invention with the insert installed.
Figure 8B:
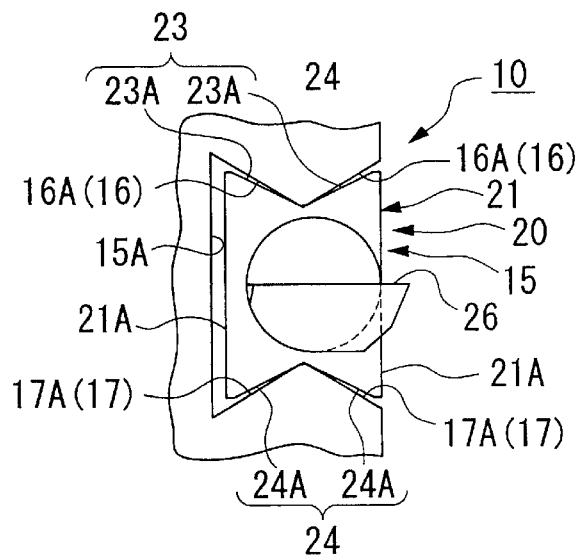
FIG. 8B is a front view of the tool for bore diameter work according to another embodiment of the present invention with the insert installed.
Figure 8C:
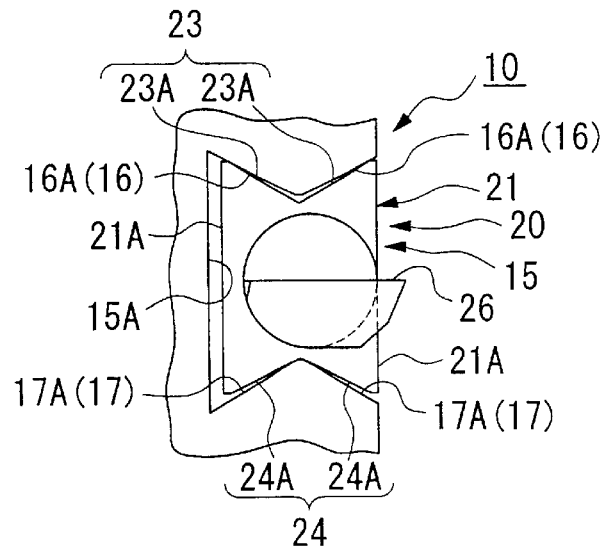
FIG. 8C is a front view of the tool for bore diameter work according to another embodiment of the present invention with the insert installed.

For example, as shown in FIG. 8A, of the wall faces 23A and 24A, which constitute the top and bottom faces 23 and 24 of the insert main body 21, only the wall faces which are near the side faces 21A of the insert main body 21 are contacting the first and second insert restraining faces 16 and 17. Alternatively, as shown in FIG. 8B, of the wall faces 23A and 24A, which constitute the top and bottom faces 23 and 24 of the insert main body 21, only the sections near the intersection ridgelines between the wall faces 23A and between the wall faces 24A, are contacting the first and second insert restraining faces 16 and 17. Alternatively, as shown in FIG. 8C, of the wall faces 23A which constitute the top face 23 of the insert main body 21, only the sections near the side faces 21A of the insert main body 21 are contacting the first insert restraining face 16, and in addition, of the wall faces 24A which constitute the bottom face 24 of the insert main body 21, only the sections near the intersection ridgelines between the wall faces 24A are contacting the second insert restraining face 17.

Figure 9:
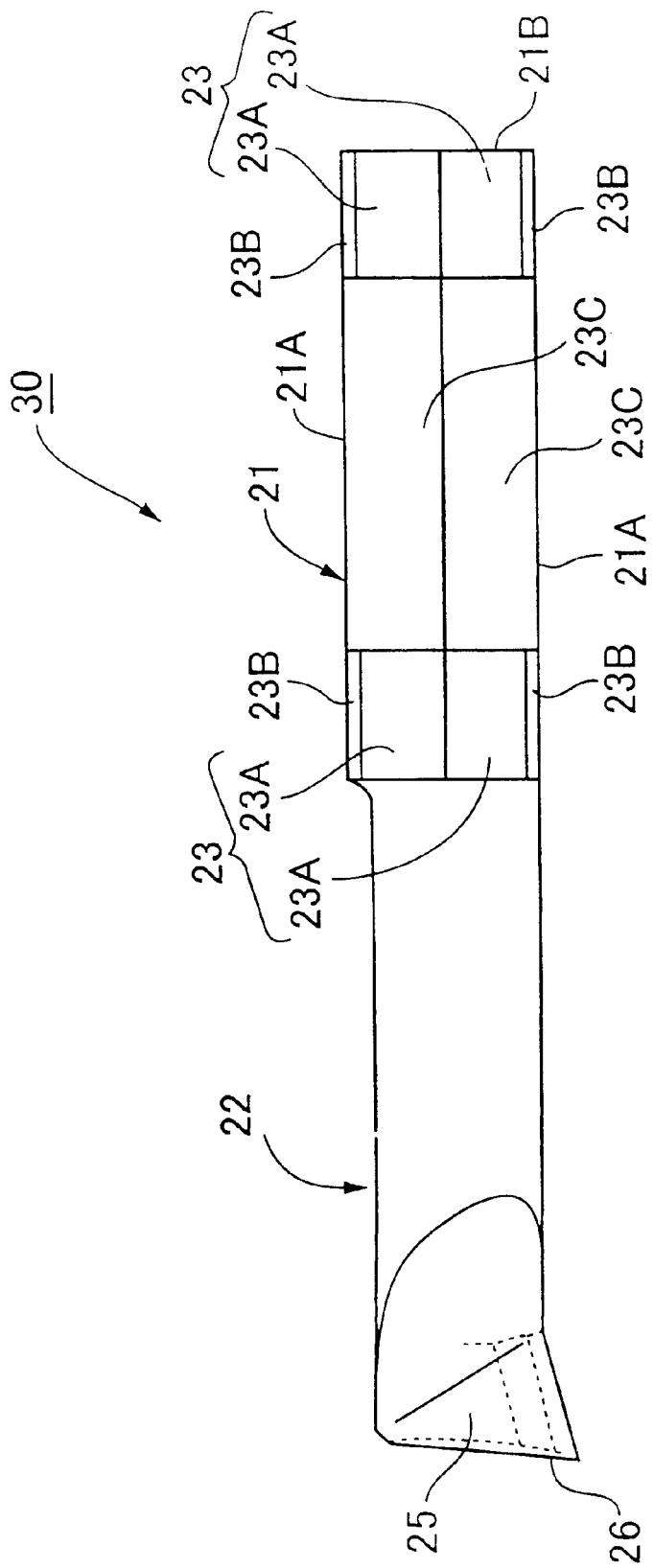
FIG. 9 is a top view of another embodiment of the insert which is installed in the tool for bore diameter work of the present invention.
Figure 10:
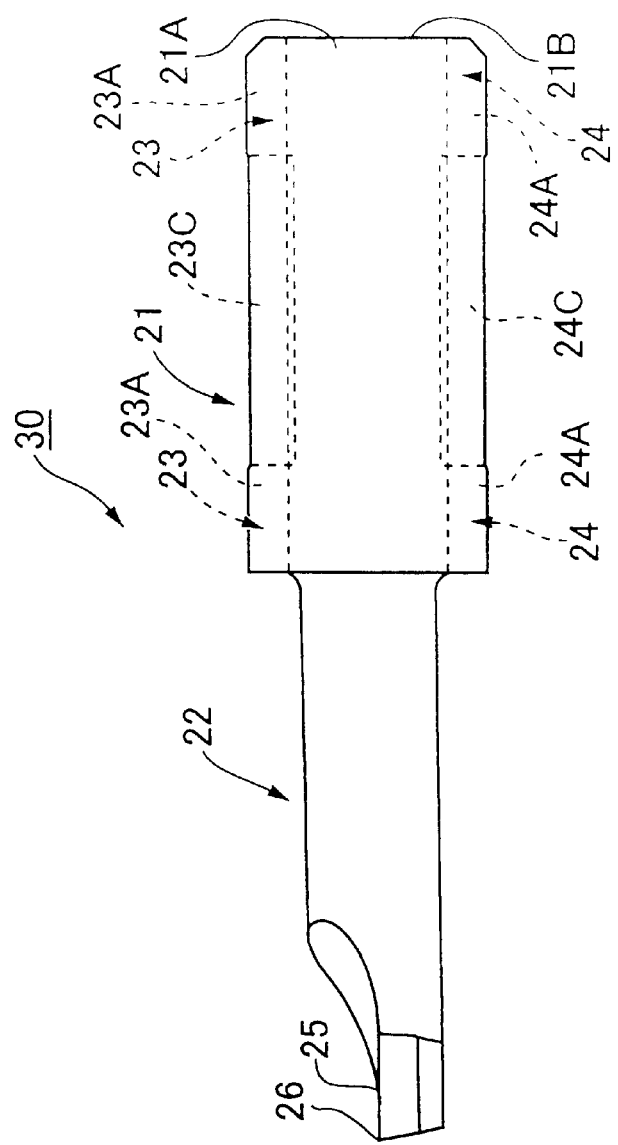
FIG. 10 is a side view of the insert of FIG. 9.
Figure 11:
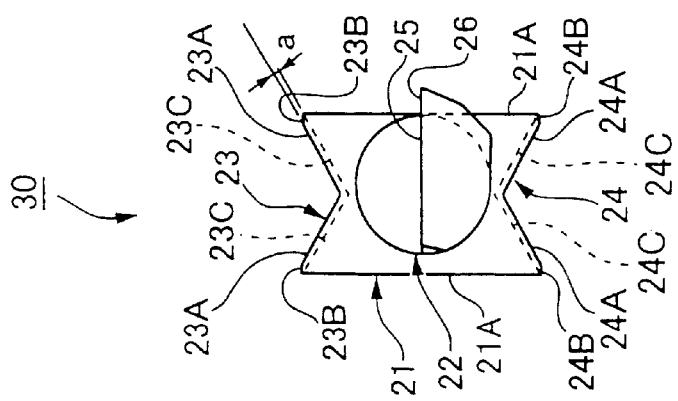
FIG. 11 is a front view of the insert of FIG. 9.

FIGS. 9 to 11 show a modification of the insert, installed in the shank 11, wherein escapes are provided the top and bottom faces of the insert main body. In the following explanation, the same sections as those of the insert 20 described above are represented by the same reference numerals.

In this insert 30, the insert main body 21 is thinner by a predetermined depth to form escape faces 23C and 24C except for the tip and base sections of the top face 23 and bottom face 24.

In the tool for bore diameter work which uses the insert 30 having the escape faces 23C and 24C in its top face 23 and bottom face 24, the same effects as above can be obtained. In particular, since only the insert tip and base sides of the top face 23 and the bottom face 24 are pressed by the first and second insert restraining faces 16 and 17, the insert 30 can be firmly secured without working the top face 23 and bottom face 24 of the insert main body 21 to exactly the same shape as the first and second insert restraining faces 16 and 17, and it is not necessary to strictly control the work precision of the insert 30.

Figure 12A:
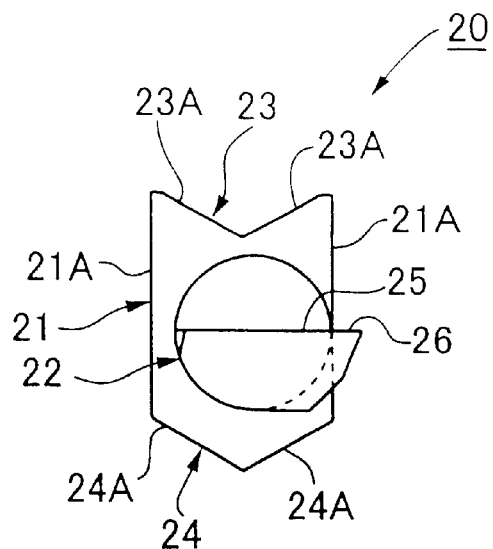
FIG. 12A is a front view of another embodiment of the insert which is installed in the tool for bore diameter work of the present invention.
Figure 12B:
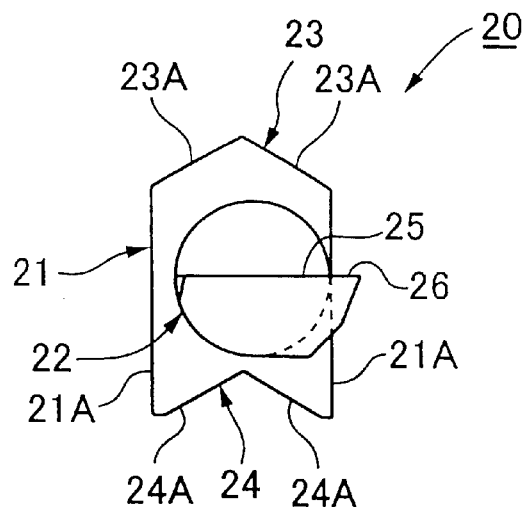
FIG. 12B is a front view of another embodiment of the insert which is installed in the tool for bore diameter work of the present invention.

In this embodiment, first and second insert restraining faces 16 and 17 have projecting V-shapes parallel to the longitudinal direction of the shank 11, and the top face 23 and bottom face 24 of the insert main body 21 have indented V-shapes in correspondence therewith, but the constitution is not restricted to this. As shown by way of example in FIG. 12A, the top face 23 of the insert main body 21 may be an indented V-shape, and the bottom face 24, a projecting V-shape. In the alternative example shown in FIG. 12B, the top face 23 of the insert main body 21 may be a projecting V-shape, and the bottom face 24, an indented V-shape.

Figure 12C:
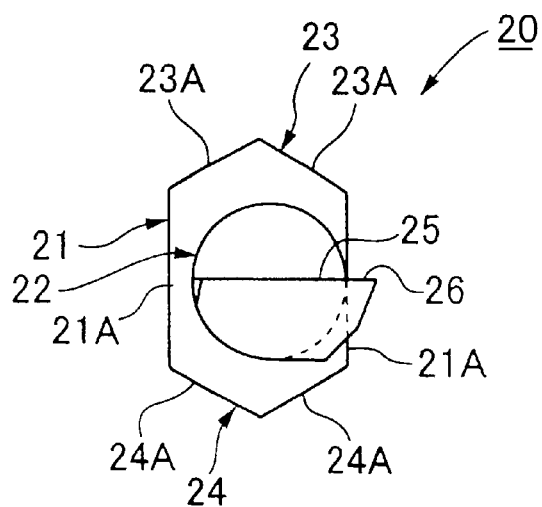
FIG. 12C is a front view of another embodiment of the insert which is installed in the tool for bore diameter work of the present invention.

Furthermore, as shown in FIG. 12C, the top and bottom faces 23 and 24 of the main insert body 21 may each have a projecting V-shape. In each of these cases, the tool for bore diameter work, which comprises the first and second insert restraining faces 16 and 17 having shapes corresponding to these top and bottom faces 23 and 24, obtains the same effects as above without any deterioration.

Figure 13:
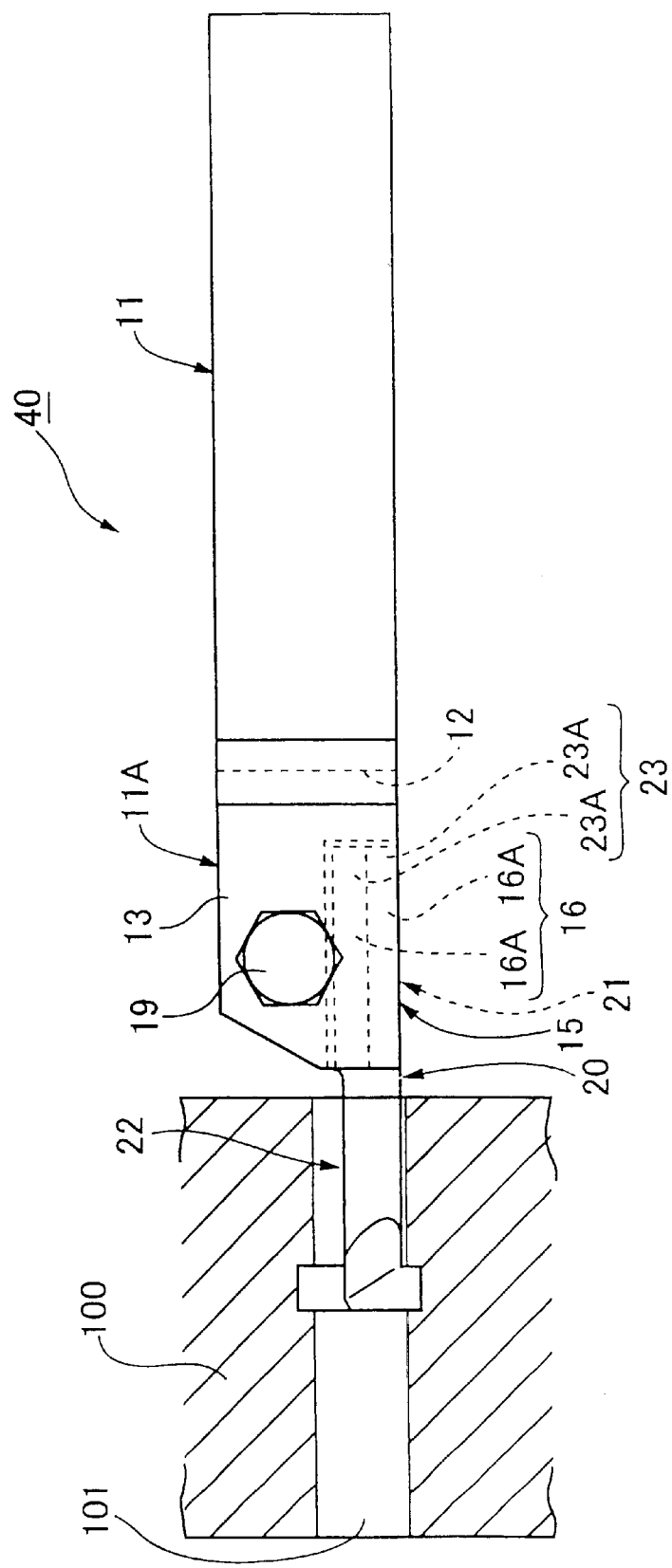
FIG. 13 is a diagram showing an embodiment where the present invention is applied in a tool for bore diameter work for inserting grooves.
Figure 14:
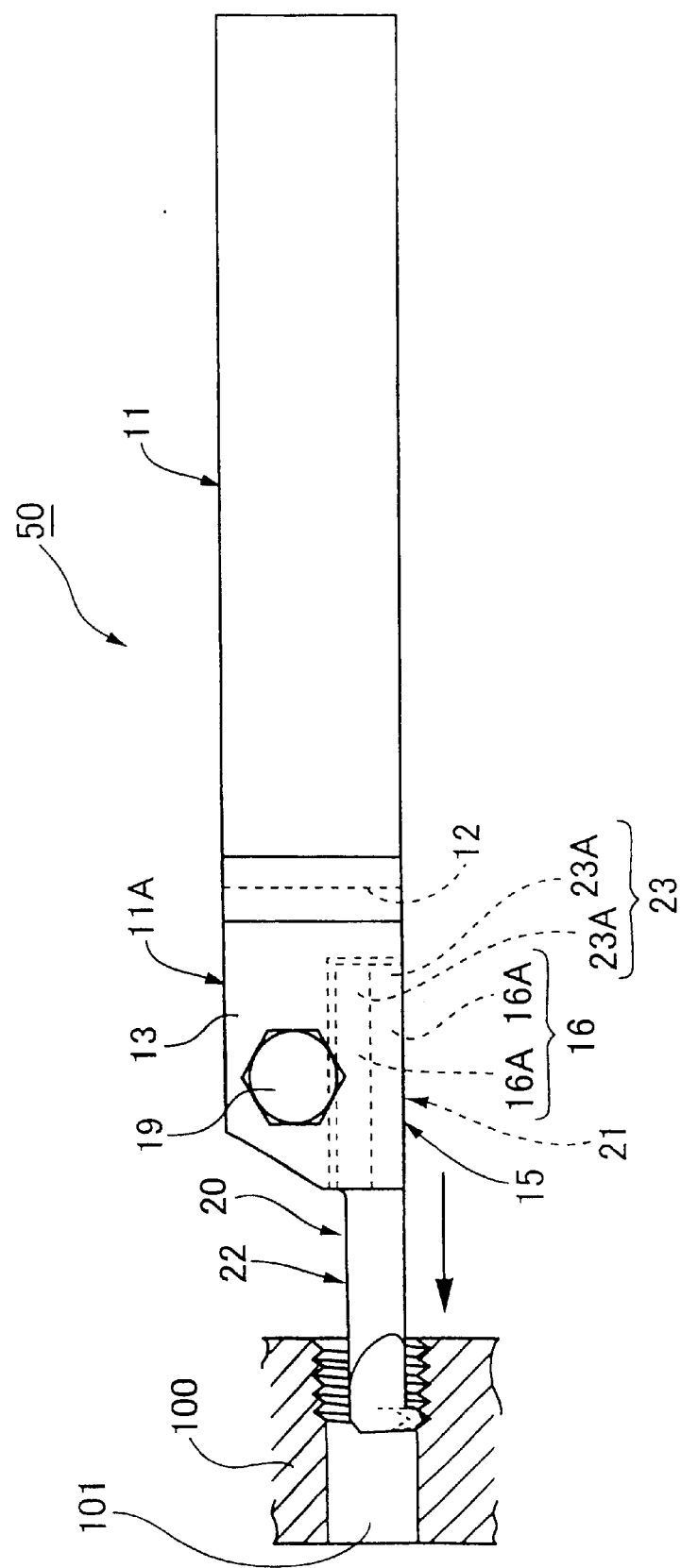
FIG. 14 is a diagram showing an embodiment where the present invention is applied in a tool for bore diameter work for screw-cutting.

The explanation of this embodiment describes the tool for bore diameter work 10 for carrying out boring work, but this invention can be applied in tools for work bore diameter which are used in other bore diameter work. For example, this invention can be applied in a tool for bore diameter work for groove insertion work 40 as shown in FIG. 13, and in a tool for bore diameter work for screw-cutting work 50 as shown in FIG. 14.

What is claimed is:

1. A tool for bore diameter work comprising:

a pair of insert restraining faces, provided opposite each other at a tip portion of a shank and formed by an insert installation passageway with a slit extending side-by-side with the insert installation passageway, which is pressed by a clamping unit so that the pair of insert restraining faces move closer to each other, pressingly securing top and bottom faces of a throw-away insert, which directly contacts the pair of insert restraining faces, the throw-away insert comprising a substantially rod-like protrusion having a cutting-blade which projects to the tip side of the shank;

the pair of insert restraining faces having an indented or projecting V-shape parallel to the longitudinal direction of the shank, and the top and bottom faces of the throw-away insert having a projecting or indented V-shape which can connect with the pair of insert restraining faces.

2. A boring tool, comprising:

a longitudinally extending insert having a insert main body and a protrusion connected to and projecting from the insert main body, the insert main body having in cross-section an opposing pair of flat sidewalls and an opposing pair of V-shaped clamping surfaces, a respective one of the pair of V-shaped clamping surfaces connected to and between the flat sidewalls to form in cross-section a polygonal configuration having opposing equilateral sides;

a longitudinally extending shank having a proximal portion with a insert installation passageway configured in cross-section to substantially comport with the polygonal configuration of the insert and a slit in communication with the insert installation passageway dividing the proximal portion of the shank into a first insert restraining section and a second insert restraining section resiliently connected to the first insert restraining section to move between a normally opened condition for slidably receiving the insert through the insert installation passageway and a clamping condition for clamping the pair of V-shaped clamping surfaces of the insert to and between the first and second restraining sections to restrain the insert in the proximal portion when received by the insert installation passageway; and a fastener connected to the first and second insert restraining sections and operative to move the first and second insert restraining sections from the normally opened condition to the clamping condition by at least partially collapsing the slit.

3. A boring tool according to claim 2, wherein the fastener is a bolt extending through the slit.

4. A boring tool according to claim 2, wherein the insert installation passageway receives both of the opposing V-shaped clamping surfaces.

5. A boring tool according to claim 4, wherein the insert installation passageway receives only one of the pair of flat sidewalls.

6. A boring tool according to claim 2, wherein each one of the pair of the V-shaped clamping surfaces is projected.

7. A boring tool according to claim 2, wherein each one of the pair of the V-shaped clamping surfaces is intented.

8. A boring tool according to claim 2, wherein one of the pair of the V-shaped clamping surfaces is projected and a remaining one of the pair of the V-shaped clamping surfaces is indented.

9. A boring tool according to claim 2, wherein the proximal portion has a front face with both the insert installation passageway and the slit forming an opening into the front face.

10. A boring tool according to claim 9, wherein the insert installation passageway and the slit extend side-by-side with one another in order to communicate with one another longitudinally along the proximal portion.

11. A boring tool according to claim 10, wherein the fastener is disposed such that as viewed in side elevation the fastener and the main body of the insert criss-cross one another.

\* \* \* \* \*